(12) United States Patent
Defrain

(10) Patent No.: US 10,526,473 B2
(45) Date of Patent: Jan. 7, 2020

(54) CURABLE LIQUID RUBBER COMPOSITIONS AND METHODS OF MANUFACTURING THE SAME

(71) Applicant: FINA TECHNOLOGY, INC., Houston, TX (US)

(72) Inventor: Olivier Defrain, Malling (FR)

(73) Assignee: FINA TECHNOLOGY, INC., Houston, TX (US)

(*) Notice: Subject to any disclaimer, the term of this patent is extended or adjusted under 35 U.S.C. 154(b) by 57 days.

(21) Appl. No.: 15/950,426

(22) Filed: Apr. 11, 2018

(65) Prior Publication Data
US 2019/0315943 A1    Oct. 17, 2019

(51) Int. Cl.
    *C08L 9/00* (2006.01)
(52) U.S. Cl.
    CPC .......... *C08L 9/00* (2013.01); *C08L 2312/00* (2013.01)
(58) Field of Classification Search
    CPC .................. C08L 9/00; C08L 2312/00
    USPC ......................................... 524/729
    See application file for complete search history.

(56) References Cited

U.S. PATENT DOCUMENTS

| | | |
|---|---|---|
| 4,600,745 A | 7/1986 | Creighton |
| 5,096,201 A | 3/1992 | Egashira et al. |
| 6,204,321 B1 | 3/2001 | Lanoye |
| 6,361,643 B2 | 3/2002 | Born et al. |
| 8,137,500 B2 | 3/2012 | Sauer et al. |
| 2006/0116481 A1 | 6/2006 | Morgan |
| 2007/0299193 A1 | 12/2007 | Sauer et al. |
| 2011/0218056 A1* | 9/2011 | Sullivan ............ A63B 37/12  473/377 |
| 2014/0235779 A1 | 8/2014 | Goss, Jr. |

FOREIGN PATENT DOCUMENTS

| | | |
|---|---|---|
| CN | 105860533 A | 8/2016 |
| EP | 0524058 A1 | 1/1993 |
| JP | 6094434 A | 5/1985 |
| JP | 5459189 B2 | 4/2014 |
| WO | 9849222 A1 | 11/1998 |

* cited by examiner

*Primary Examiner* — William K Cheung
(74) *Attorney, Agent, or Firm* — Albert Shung

(57) ABSTRACT

A curable liquid rubber composition having improved viscosity stability is provided. The curable liquid rubber composition includes at least one functionalized crosslinkable polymer that is liquid at 25° C., contains at least one diene monomer in polymerized form, and is functionalized with one or more anhydride functional groups, one or more hydroxyl functional groups or one or more (meth)acrylate functional groups; at least one non-functionalized crosslinkable polymer that is liquid at 25° C., contains at least one diene monomer in polymerized form, and is not functionalized with anhydride, hydroxyl or (meth)acrylate functional groups; at least one metallic monomer coagent which is a metal carboxylate salt containing at least one (meth)acrylate functional group; and at least one inorganic filler. The curable liquid rubber composition has a total moisture content of not more than 1000 ppm, whereby controlling the amount of water reduces the tendency of the composition to exhibit an increase in viscosity over time.

20 Claims, 2 Drawing Sheets

CURABLE LIQUID RUBBER COMPOSITIONS AND METHODS OF MANUFACTURING THE SAME

FIELD OF THE INVENTION

Aspects of the invention are directed to curable liquid rubber compositions having improved viscosity stability and, particularly, curable liquid rubber compositions including a metallic monomer coagent, as well as methods of manufacturing the same.

BACKGROUND OF THE INVENTION

Curable liquid rubber compositions are commonly used as adhesives and/or sealants in the automotive industry. Depending on the intended purpose or the curable liquid rubber composition, various types of liquid rubber compositions may be used such as compositions based on various types of diene polymers and copolymers that are liquid at 25° C. The crosslinking agent for these compositions is generally sulfur or a sulfur compound. In body and paint shops, these liquid rubber compositions are typically cured at temperatures ranging from 145° C. to 190° C.

To increase the reactivity of the vulcanization and peroxide systems, coagents containing a metallic compound may be introduced into curable liquid rubber compositions. The incorporation of coagents containing a metallic compound into typical curable liquid rubber compositions for automotive and transportation applications, however, often causes a destabilization of the curable liquid rubber composition during storage at temperatures of about 40° C. or more over several weeks, resulting in an undesirable increase in the viscosity of the composition.

Accordingly, curable liquid rubber compositions containing a metallic compound and having improved stability characteristics are greatly desired.

SUMMARY OF THE INVENTION

It has now been discovered that the viscosity stability of curable liquid rubber compositions containing metallic monomer coagent may be significantly improved by formulating such compositions to ensure that they contain low levels of moisture, e.g., a total moisture content of not more than 1000 ppm. In particular, the use of relatively dry inorganic fillers has been found to help reduce the tendency of these types of compositions to increase in viscosity when stored for a period of time.

Aspects of the invention are directed to curable liquid rubber compositions having improved viscosity stability and, particularly, curable liquid rubber compositions including a metallic monomer coagent which have improved viscosity stability, as well as methods of manufacturing the same.

Various exemplary aspects of the invention may be summarized as follows:

Aspect 1: A curable liquid rubber composition having improved viscosity stability, wherein the curable liquid rubber composition is comprised of:

a). at least one functionalized crosslinkable polymer that is liquid at 25° C., is comprised of at least one diene monomer in polymerized form, and is functionalized with one or more anhydride functional groups, one or more hydroxyl functional groups or one or more (meth)acrylate functional groups;

b). at least one non-functionalized crosslinkable polymer that is liquid at 25° C., is comprised of at least one diene monomer in polymerized form, and is not functionalized with one or more anhydride, hydroxyl or (meth)acrylate functional groups;

c). at least one metallic monomer coagent which is a metal carboxylate salt comprised at least one (meth)acrylate functional group; and d). at least one inorganic filler;

wherein the curable liquid rubber composition has a total moisture content of not more than 1000 ppm.

Aspect 2: The curable liquid rubber composition of Aspect 1, wherein the at least one diene monomer of the at least one functionalized crosslinkable polymer or the at least one non-functionalized crosslinkable polymer comprises butadiene.

Aspect 3: The curable liquid rubber composition of Aspect 1 or 2, wherein at least one of the functionalized crosslinkable polymer(s) or the non-functionalized crosslinkable polymer(s) has a number average molecular weight of 800 g/mol to 15,000 g/mol.

Aspect 4: The curable liquid rubber composition of any of Aspects 1 to 3, wherein at least one of the functionalized crosslinkable polymer(s) or the non-functionalized crosslinkable polymer(s) is selected from the group consisting of butadiene homopolymers and styrene-butadiene copolymers.

Aspect 5: The curable liquid rubber composition of any of Aspects 1 to 4, wherein at least one of the functionalized crosslinkable polymer(s) or the non-functionalized crosslinkable polymer(s) has a vinyl content of 0.1% to 90%.

Aspect 6: The curable liquid rubber composition of any of Aspects 1 to 5, wherein the at least one functionalized crosslinkable polymer includes at least one maleinized crosslinkable polymer.

Aspect 7: The curable liquid rubber composition of any of Aspects 1 to 6, wherein the at least one metallic monomer coagent includes an alkali metal salt, alkaline earth metal salt, transition metal salt or post-transition salt of (meth)acrylic acid.

Aspect 8: The curable liquid rubber composition of any of Aspects 1 to 7, wherein the at least one metallic monomer coagent includes at least one of a zinc carboxylate salt comprised of at least one (meth)acrylate functional group or a calcium carboxylate salt comprised of at least one (meth)acrylate functional group.

Aspect 9: The curable liquid rubber composition of any of Aspects 1 to 8, wherein the at least one metallic monomer coagent includes at least one of a zinc carboxylate salt comprised of two (meth)acrylate functional groups or a calcium carboxylate salt comprised of two (meth)acrylate functional groups.

Aspect 10: The curable liquid rubber composition of any of Aspects 1 to 9, wherein the at least one metallic monomer coagent comprises at least one of zinc di(meth)acrylate or calcium di(meth)acrylate.

Aspect 11: The curable liquid rubber composition of any of Aspects 1 to 10, wherein the at least one inorganic filler comprises at least one inorganic filler selected from the group consisting of metal carbonates, metal oxides, silicas, carbon black, and clays.

Aspect 12: The curable liquid rubber composition of any of Aspects 1 to 11, wherein the at least one inorganic filler has an average particle size of 6.5 μm or less.

Aspect 13: The curable liquid rubber composition of any of Aspects 1 to 12, where the at least one inorganic filler has an average particle size of 3.0 μm or less.

Aspect 14: The curable liquid rubber composition of any of Aspects 1 to 13, wherein the at least one inorganic filler has a moisture content of not more than 0.05% by weight.

Aspect 15: The curable liquid rubber composition of any of Aspects 1 to 14, further comprising a crosslinking system.

Aspect 16: The curable liquid rubber composition of Aspect 15, wherein the crosslinking system is a sulfur-based or a peroxide-based crosslinking system.

Aspect 17: The curable liquid rubber composition of any of Aspects 1 to 16, wherein the curable liquid rubber composition has a viscosity at 25° C. and the viscosity of the curable liquid rubber composition at 25° C. does not change by more than 60% after being heated at 40° C. for 20 days.

Aspect 18: A cured cross-linked rubber obtained by curing the curable liquid rubber composition of any of Aspects 1 to 17.

Aspect 19: A method of obtaining a cured cross-linked rubber, comprising curing the curable liquid rubber composition of any of Aspects 1 to 17.

Aspect 20: A method of improving the viscosity stability of a curable liquid rubber composition, wherein the curable liquid rubber composition is comprised of:

a). at least one functionalized crosslinkable polymer that is liquid at 25° C., is comprised of at least one diene monomer in polymerized form, and is functionalized with one or more anhydride functional groups, one or more hydroxyl functional groups or one or more (meth)acrylate functional groups;

b). at least one non-functionalized crosslinkable polymer that is liquid at 25° C., is comprised of at least one diene monomer in polymerized form, and is not functionalized with one or more anhydride, hydroxyl or (meth)acrylate functional groups;

c). at least one metallic monomer coagent which is a metal carboxylate salt comprised of at least one (meth)acrylate functional group; and d). at least one inorganic filler;

wherein the method comprises formulating the curable liquid rubber composition to have a total moisture content of not more than 1000 ppm.

BRIEF DESCRIPTION OF THE DRAWINGS

The invention is best understood from the following detailed description when read in connection with the accompanying drawings. Included in the drawings are the following figures.

DETAILED DESCRIPTION OF THE INVENTION

Figure 1:
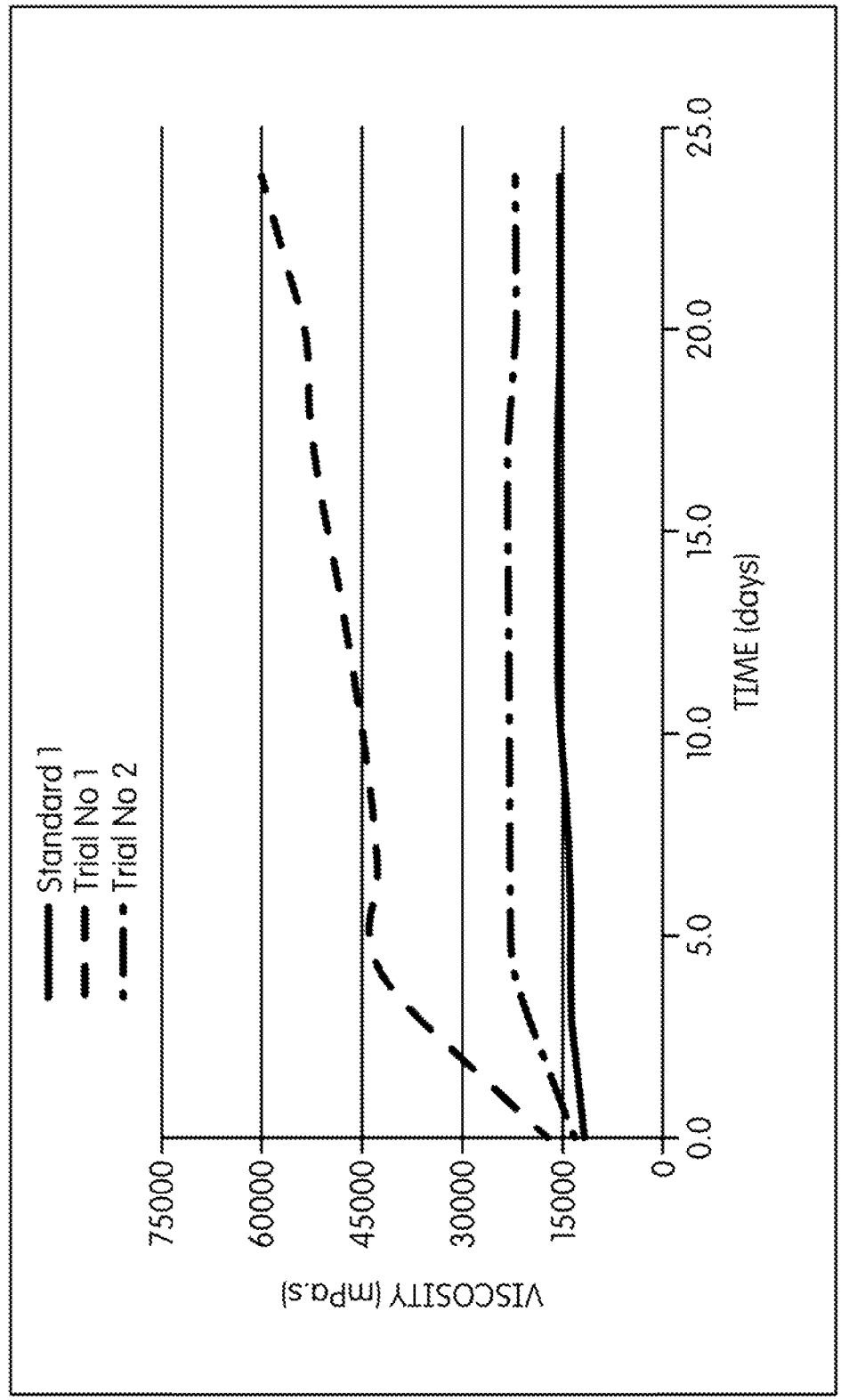
FIG. 1 is a graph depicting the viscosities of curable liquid rubber compositions comprising a metallic monomer coagent and inorganic fillers having different moisture contents during storage at 40° C.

Aspects of the invention are directed to curable liquid rubber compositions having improved viscosity stability and, particularly, curable liquid rubber compositions including a metallic monomer coagent and having improved viscosity stability, as well as methods of manufacturing the same. The present inventors recognized that curable liquid rubber compositions for automotive and transportation applications that contain metallic monomer coagents often exhibited destabilization during storage. After conducting substantial research and experimental testing, the inventors discovered that the residual moisture content contained by, for example, inorganic fillers adversely affects the stability of a curable liquid rubber composition containing a metallic monomer coagent, and produces inferior cured rubber compositions after storage. The inventors further recognized that the stability of the rubber composition could be measured by determining the change in the viscosity of the curable liquid rubber composition during storage.

In view of the foregoing, aspects of the invention provide curable liquid rubber compositions having improved viscosity stability. According to one aspect of the invention, provided is a curable liquid rubber composition containing at least at least one functionalized crosslinkable polymer, at least one non-functionalized crosslinkable polymer, at least one metallic monomer coagent, and at least one inorganic filler, wherein the curable liquid rubber composition has a total moisture content of not more than 1000 ppm.

The functionalized crosslinkable polymer is liquid at 25° C. and is comprised of at least one diene monomer in polymerized form. The functionalized crosslinkable polymer is functionalized with one or more anhydride functional groups, one or more hydroxyl functional groups or one or more (meth)acrylate functional groups per polymer molecule. Different types of such functional groups may be used in combination, provided they are compatible with each other. For example, an anhydride-functionalized crosslinkable polymer ordinarily should not be combined with a hydroxyl-functionalized polymer in the formulations of the present invention, due to the tendency of such functional groups to react with each other.

The functional groups may be positioned at one or more of the terminal ends of the polymer and/or distributed along the backbone of the polymer. For example, the functionalized crosslinkable polymer may include one anhydride groups, two anhydride groups, three anhydride groups, four anhydride groups, five anhydride groups, six anhydride groups or more per polymer chain. The anhydride functional group(s) may be introduced into the polymer (e.g., a diene homopolymer) by any suitable or known method, such as derivatization of a polymer by reaction with an unsaturated anhydride such as maleic anhydride. In one embodiment, the functionalized crosslinkable polymer is a maleinized crosslinkable polymer, in particular, a maleinized polybutadiene (which may also be considered to be a maleic anhydride adduct of polybutadiene) or a maleinized styrene-butadiene copolymer.

The non-functionalized crosslinkable polymer is liquid at 25° C. and is comprised of at least one diene monomer in polymerized form. The non-functionalized crosslinkable polymer is not functionalized with any anhydride, hydroxyl or (meth)acrylate groups. The diene monomers of the non-functionalized crosslinkable polymer and/or the functionalized crosslinkable polymer may be cumulated diene monomers, conjugated diene monomers, and/or unconjugated diene monomers. For example, the diene monomers may be butadiene monomers, isoprene monomers, farnesene monomers or the like and combinations thereof. In one embodiment, at least one diene monomer of the functionalized crosslinkable polymer or the non-functionalized crosslinkable polymer comprises butadiene. The diene monomer(s) may be copolymerized with one or more non-diene monomers, such as styrenic monomers (e.g., styrene) or acrylonitrile. In particular embodiments, the functionalized crosslinkable polymer and/or the non-functionalized crosslinkable polymer may be selected from the group consisting of butadiene homopolymers and styrene-butadiene copolymers. The polymeric backbones of the functionalized crosslinkable polymer and the non-functionalized crosslinkable polymer may be the same as or different from each other. For example, one polymer may be a butadiene homopolymer and the other polymer may be a styrene-butadiene copolymer. Combinations of different non-functionalized crosslinkable polymers may be used in the compositions of the present invention.

The functionalized crosslinkable polymer and/or the non-functionalized crosslinkable polymer may have a number average molecular weight (as determined by gel permeation chromatography) of 300 g/mol to 30,000 g/mol. Preferably, the number average molecular weight of the polymers is 400 g/mol to 25,000 g/mol, more preferably 500 g/mol to 20,000 g/mol, most preferably 800 g/mol to 15,000 g/mol. The number average molecular weights of the functionalized crosslinkable polymer and the non-functionalized crosslinkable polymer may be the same as or different from each other. In one embodiment, at least one of the functionalized crosslinkable polymer or the non-functionalized crosslinkable polymer has a number average molecular weight of 800 g/mol to 15,000 g/mol. Additionally and/or alternatively, at least one of the functionalized crosslinkable polymer or the non-functionalized crosslinkable polymer has a vinyl content of 0.1% to 90% or a vinyl content of, e.g., 1% to 90% or 10% to 85%. The functionalized crosslinkable polymer may have a vinyl content that is the same as, or different from, the vinyl content of the non-functionalized crosslinkable polymer.

The ratio of functionalized crosslinkable polymer to non-functionalized crosslinkable polymer in the curable liquid rubber composition may be varied as may be desired depending upon the particular crosslinkable polymers used, the desired properties of the curable liquid rubber composition in both an uncured and cured state, as well as other factors. Typically, however, more non-functionalized crosslinkable polymer than functionalized crosslinkable polymer is present. For example, the weight ratio of non-functionalized crosslinkable polymer to functionalized crosslinkable polymer may be from 1.5:1 to 10:1.

Suitable functionalized and non-functionalized polymers may be prepared using any method known in the art and may also be obtained from commercial sources. The liquid rubbers sold under the brand names POLY BD, RICACRYL, KRASOL, RICON and RICOBOND by Total Cray Valley are suitable for use, for example.

The curable liquid rubber composition includes at least one metallic monomer coagent. The metallic monomer coagent contains at least one metal atom (preferably, a zinc atom, an alkali metal atom or an alkaline earth metal atom, which may be in ionic form, e.g., a cation) and at least one functional group capable of reacting and participating in a crosslinking reaction when the curable liquid rubber composition is curable, such as a polymerizable ethylenically unsaturated functional group, e.g., a vinyl, allyl or (meth) acrylate functional group. The metallic monomer coagent may be a metal carboxylate salt comprised of at least one (meth)acrylate functional group. As used herein, the term "(meth)acrylate" refers to both acrylate (—O—C(=O)CH=CH$_2$) and methacrylate (—OC(=O)C(CH$_3$)=CH$_2$). The metallic monomer coagent may be comprised of two or more (meth)acrylate functional groups and/or may be a di(meth)acrylate. The metallic monomer coagent may comprise one or more alkali metals and/or alkaline earth metals and/or transition metals and/or post-transition metals. For example, the metallic monomer may comprise one or more of Li, Na, K, Rb, Cs, Be, Mg, Ca, Zn, Fe, Zr, Al, Sr, Ni, and/or Ba, with Zn and Ca generally being most preferred. Preferably, the metallic monomer coagent includes an alkali metal salt, alkaline earth metal salt, transition metal salt or post-transition metal salt of (meth)acrylic acid. Additionally and/or alternatively, the metallic monomer coagent includes at least one of a zinc carboxylate salt or a calcium carboxylate salt. The metallic monomer coagent may include a zinc carboxylate salt and/or a calcium carboxylate salt comprised of at least one (meth)acrylate functional group, e.g., one (meth)acrylate functional group, two (meth)acrylate functional groups, etc. In one embodiment, the metallic monomer coagent comprises zinc di(meth)acrylate (e.g., at least one of zinc diacrylate or zinc dimethacrylate). In another embodiment, the metallic monomer coagent comprises at least one of calcium diacrylate or calcium dimethacrylate. In other embodiments, the curable liquid rubber composition comprises at least one metallic monomer coagent corresponding to the formula M(O—C(=O)CR=CH$_2$)$_x$, wherein R is hydrogen or methyl and M is an alkali metal or alkaline earth metal having a valency of x (in particular, M can advantageously be Zn and/or Ca).

Metallic monomer coagents suitable for use in the present invention may be prepared using any method known in the art (for example, by reacting a metal oxide with (meth) acrylic acid) or may be obtained from commercial sources, including Total Cray Valley (under the brand name DYMALINK).

The curable liquid rubber composition also includes at least one inorganic filler. The at least one inorganic filler may include one or more metal carbonates such as calcium carbonate and magnesium carbonate, metal oxides such as magnesium oxide, titanium dioxide, calcium oxide, zirconium oxide and aluminum oxide (aluminas), silicas (including silicates, such as mica, vermiculite and talc, and glass), carbonaceous fillers (e.g., carbon black, graphite), clays, and/or the like and combinations thereof. In certain cases, a particular substance may perform more than one function; for example, zinc oxide could function as both an inorganic filler and a vulcanization promoter. The inorganic filler may be in any suitable form; in certain embodiments, the inorganic filler is in the form of particles. Inorganic fillers may, for example, be in the form of flakes, fibers or powders. Preferably, the inorganic filler has an average particle size of 10 μm or less, e.g., 8 μm or less, 6 μm or less, 4 μm or less, etc. In one embodiment, the inorganic filler has an average particle size of 6.5 μm or less. In another embodiment, the average particle size of the inorganic filler is 3.0 μm or less. The inorganic filler may have a moisture content, as measured shortly before being combined with other components of the curable rubber composition, of not more than 0.2% by weight. For example, the moisture content of the inorganic filler, as measured shortly before being combined with other components of the curable liquid rubber composition, may be 0.18% or less by weight, 0.16% or less by weight, 0.14% or less by weight, 0.12% or less by weight, 0.10% or less by weight, 0.08% or less by weight, 0.06% or less by weight, 0.05% or less by weight, 0.04% or less by weight, or 0.03% or less by weight. In one embodiment, the inorganic filler has a moisture content, as measured shortly before being combined with other components of the curable liquid rubber composition, of not more than 0.05% by weight. If the moisture content of the inorganic filler(s) intended to be used to formulate the curable liquid rubber composition exceeds the target or desired level, it may be lowered as needed through the use of any effective drying technique such as, for example, heating in an oven (e.g., a vacuum oven). The moisture content of materials may be measured using any of the different analytical methods known in the art, such as by use of a specific analyzer (as a Computrac Vapor Pro apparatus), a weight loss method wherein a filler sample is placed in an oven stabilized at a temperature higher than 100° C. for several hours, or by carrying out a TGA analysis on a sample.

The rubber composition may include a crosslinking system, such as a sulfur-based and/or a peroxide-based crosslinking system. As used herein, the term "crosslinking system" refers to a component or combination of components present in the curable liquid rubber composition which, when the curable liquid rubber composition is heated, is capable of causing crosslinking (sometimes also referred to as vulcanization) of the functionalized and non-functionalized crosslinkable polymers which are present in the curable liquid rubber composition (typically, the metallic monomer coagent(s) are also involved in such crosslinking reactions). The crosslinking system component(s) may directly react with certain other components of the curable liquid rubber composition and become covalently incorporated into the crosslinked polymeric network formed upon curing and/or may function as catalysts, promoters, activators or accelerators for the crosslinking reactions.

As used herein, the term "peroxide-based crosslinking system" means a crosslinking system which includes at least one peroxide compound. Suitable peroxide compounds include any of the peroxide compounds, particularly organic peroxide compounds, known in the art to be effective in crosslinking functionalized and non-functionalized polymers of the type employed in the present application, including for example peroxyketals, peroxyesters, dialkyl peroxides, percarbonates, diacyl peroxides, and the like and combinations thereof. Generally speaking, suitable peroxide compounds upon thermal decomposition generate free radicals that facilitate the curing/crosslinking of the curable liquid rubber composition.

As used herein, the term "sulfur-based crosslinking system" means a crosslinking system which includes at least one of elemental sulfur or a sulfur-containing compound. In preferred embodiments, the sulfur-based crosslinking system is comprised of elemental sulfur and at least one sulfur-containing compound (e.g., at least one sulfur-containing organic compound, which may function as an organic vulcanization accelerator). Illustrative examples of suitable sulfur-containing organic compounds include, but are not limited to, dithiocarbamates (including metal salts of disubstituted dithiocarbamic acid), sulfenamides (e.g., benzothiazolesulfenamides, thiocarbamyl sulfenamides); thiazoles (in particular benzothiazoles such as MBTS, 2,2'-dibenzothiazyl disulfide); thioureas; thiurams (which may be prepared from secondary amines and carbon disulfide). Zinc compounds, including both inorganic and organic zinc compounds, may also be present in the sulfur-based crosslinking system. Such compounds may generally be distinguished from the metallic monomer coagents which are also a component of the curable liquid rubber compositions of the present invention in that they do not contain ethylenically unsaturated functional groups which participate in crosslinking reactions when the composition is cured. Zinc oxide is an example of a suitable inorganic zinc compound and zinc salts of carboxylic acids (e.g., zinc stearate) are examples of suitable organic zinc compounds. Other types of metal oxides besides zinc oxide may be part of the sulfur-based crosslinking system (e.g., calcium, magnesium or lead oxides). The sulfur-based crosslinking system may include any of the other crosslinking adjuvants known in the rubber vulcanization art, such as fatty acids, aldehyde/amine accelerators, sulfur donors (e.g., 4,4'-dithiodimorpholine) and guanidines.

The crosslinking system may comprise one or more anti-degradants, retarders or anti-scorch agents. Any of such additives known in the art may be employed.

Optionally, in addition to the above-mentioned components, the curable liquid rubber compositions of the present invention may comprise one or more further additives, depending upon the intended end-use of the composition. Suitable additional types of additives include, for example, organic fillers, pigments, UV stabilizers, antioxidants, adhesion promoters, rheology control agents, plasticizers, mold release agents, thermoplastic polymers, non-reactive polymers, solid reactive (curable) polymers (e.g., diene rubbers which are solid at 25° C.), tackifiers, anti-tack agents, dispersants, solvents, coagents other than the metallic monomer coagents described herein (e.g., various types of vinyl-, alkyl- (meth)acryl- and/or other ethylenically unsaturated functionalized monomers, including polyfunctionalized coagent monomers) and the like. However, in certain embodiments, the curable liquid rubber composition is free or essentially free (e.g., less than 0.1 wt %) of any or all of such further additives.

The curable liquid rubber composition has a total moisture content of not more than 1000 ppm. The total moisture content may, for example, be calculated based on the measured moisture content of each component of the composition, provided appropriate care is taken to avoid the introduction of additional moisture during preparation or storage of the composition. It is also possible to determine the moisture content of a liquid rubber composition by using a specific analyzer (such as Computrac Vapor Pro apparatus) or by a weight loss method involving introducing the liquid rubber compositions (without heat-activated crosslinking agents) in an oven stabilized at a temperature higher than 100° C. for several hours.

For example, the curable liquid rubber composition may have a total moisture content of 950 ppm or less, 900 ppm or less, 850 ppm or less, 800 ppm or less, 750 ppm or less, 700 ppm or less, 650 ppm or less, 600 ppm or less, 550 ppm or less, 500 ppm or less, or 450 ppm or less. The total moisture content of the curable liquid rubber composition may be controlled as desired by selecting components for use in preparing the curable liquid rubber compositions which have a suitably low moisture content, as explained above in connection with the inorganic filler component. If, when initially checked (prior to use in a curable liquid rubber composition), a component contains an undesirably excessive amount of moisture, it may be treated by any suitable method to lower the moisture content. It is also possible to employ components which, when combined, provide a curable liquid rubber composition having a total moisture content greater than 1000 ppm, where the moisture content of the curable liquid rubber composition is then lowered by a suitable drying method prior to storing the composition. Additionally, it may be desirable to protect the curable liquid rubber composition from moisture when stored so as to prevent the moisture content of the curable liquid rubber composition from rising above 1000 ppm.

Preferably, the curable liquid rubber composition has a viscosity at 25° C. and the viscosity of the curable liquid rubber composition at 25° C. does not change by more than 60% after being heated at 40° C. for 20 days. In one embodiment, the viscosity of the curable liquid rubber composition at 25° C. does not change by more than 45% after being heated at 40° C. for 20 days. In another embodiment, the viscosity of the curable liquid rubber composition at 25° C. does not change by more than 30% after being heated at 40° C. for 20 days. In yet a further embodiment, the viscosity of the curable liquid rubber composition at 25° C. does not change by more than 15% after being heated at 40° C. for 20 days.

According to certain preferred embodiments of the invention, the curable liquid rubber composition has an initial viscosity at 25° C., measured shortly after combining the components of the curable liquid rubber composition, of about 5,000 mPa·s to about 250,000 mPa·s. Viscosity may be measured using a standard Brookfield Viscosimeter (DV-II+) with the Spindle S serials.

Typically, the curable liquid rubber compositions of the present invention may be formulated to contain the following amounts of the above-mentioned components:
 a). 1 to 20 wt. % functionalized crosslinkable polymer(s);
 b). 5 to 65 wt. % non-functionalized crosslinkable polymer(s);
 c). 0.1 to 4 wt. % metallic monomer coagent(s);
 d). 10 to 75 wt. % inorganic filler(s);
 wherein a)+b)+c)+d) equals 100%.

The amount of crosslinking system present will vary depending upon the type of crosslinking system employed (e.g., peroxide-based crosslinking system or sulfur-based crosslinking system), the reactivities of the functionalized and non-functionalized crosslinkable polymers, the type and reactivity of the metallic monomer coagent, the relative amounts of components a)-d), and the desired curing profile and target cured rubber properties as well as other factors. For example, a curable liquid rubber composition which utilizes a sulfur-based crosslinking system may be comprised of from 3 to 20 wt. % of the sulfur-based crosslinking system (i.e., the total amount of the components in such sulfur-based crosslinking system may comprise to 20 wt. % of the curable liquid rubber composition). Typically, a curable liquid rubber composition which utilizes a peroxide-based crosslinking system may be comprised of from 0.1 to 14 wt. % of the peroxide-based crosslinking system (i.e., the total amount of the components in such peroxide-based crosslinking system may comprise 0.1 to 14 wt. % of the curable liquid rubber composition).

Curable liquid rubber compositions according to the present invention can be manufactured using any suitable mixing method known in art of formulating relatively viscous liquid rubber compositions, including by the use of mixing machines having a high shearing effect. Such machines include, for example, kneaders, planetary mixers, internal mixers, so-called Banbury mixers, double-screw extruders and the like. Care should, of course, be taken during such mixing to avoid the introduction of excessive amounts of moisture. Once prepared, the curable liquid rubber composition should be stored, until ready to be used in a curing operation, under conditions effective to minimize the ingress of water into the composition; for example, the curable liquid rubber composition may be packaged in sealed drums or totes, optionally under an atmosphere of dry gas.

According to another aspect of the invention, a method is provided for improving the viscosity stability of a curable liquid rubber composition. In one embodiment, the method includes formulating a curable liquid rubber composition to have a total moisture content of not more than 1000 ppm, wherein the curable liquid rubber composition is based on: a functionalized crosslinkable polymer that is liquid at 25° C., is comprised of at least one diene monomer in polymerized form, and is functionalized with one or more anhydride functional groups, one or more hydroxyl functional groups or one or more (meth)acrylate functional groups; a non-functionalized crosslinkable polymer that is liquid at 25° C., is comprised of at least one diene monomer in polymerized form, and is not functionalized with one or more anhydride, hydroxyl or (meth)acrylate groups; at least one metallic monomer coagent (such as a metal carboxylate salt comprised of at least one (meth)acrylate functional group); and at least one inorganic filler.

In accordance with a further aspect of the invention, a cured cross-linked rubber is provided by curing the curable liquid rubber compositions discussed herein. As a result of such curing, the curable liquid rubber composition is converted (e.g., by crosslinking reactions) into a solid, elastomeric (rubbery) composition. Typically, curing is achieved by heating the curable liquid rubber composition to a temperature effective to initiate the desired crosslinking reaction involving at least the functionalized and non-functionalized polymer components. Such temperature will depend upon the crosslinking system employed, as well as the reactivity of the other components of the curable liquid rubber composition, but generally speaking temperatures within the range of from about 100° C. to about 300° C. are suitable (with temperatures of from about 120° C. to about 200° C. being typically preferred). Heating may be carried out for a time effective to achieve the desired state of cure. Such cure times are variable, depending upon a number of factors, but typically are from about 5 minutes to about 10 hours.

Any of the known or conventional molding, shaping, forming or impregnation methods known in the art, such as casting, compression molding or injection molding, may be employed to produce articles comprised of a cured rubber obtained from the curable liquid rubber compositions of the present invention. For example, the inventive curable liquid rubber compositions may be utilized in the manufacture of belts, hoses, rubber rollers, sporting goods (such as golf balls), engineered products, vibration mounts, tires, acoustic/vibration damping articles, O rings, gaskets, wire and cable coatings, expansion joints, weather stripping, and the like, including elastomeric products or composite products containing an elastomeric component generally. The use of the curable liquid rubber compositions of the present invention as adhesives, sealants and coatings is also contemplated. The curable liquid rubber compositions may be formulated so as to be pumpable and/or sprayable for easy of handling and application.

Within this specification, embodiments, have been described in a way which enables a clear and concise specification to be written, but it is intended and will be appreciated that embodiments may be variously combined or separated without departing from the invention. For example, it will be appreciated that all preferred features described herein are applicable to all aspects of the invention described herein.

In some embodiments, the invention herein can be construed as excluding any element or process step that does not materially affect the basic and novel characteristics of the curable liquid rubber composition, process using the curable liquid rubber composition, or article made using the curable liquid rubber composition. Additionally, in some embodiments, the invention can be construed as excluding any element or process step not specified herein.

Although the invention is illustrated and described herein with reference to specific embodiments, the invention is not intended to be limited to the details shown. Rather, various modifications may be made in the details within the scope and range of equivalents of the claims and without departing from the invention.

EXAMPLES

The following non-limiting examples are provided for the purpose of elucidating the advantages obtained from aspects of the present invention.

Curable liquid rubber compositions comprising a metallic monomer coagent were tested to assess the effects of certain inorganic fillers on the stability of the curable liquid rubber compositions. The curable liquid rubber compositions assessed below generally included liquid polybutadiene resins (functionalized and non-functionalized), inorganic fillers, crosslinking system, and at least one DYMALINK® metallic coagent (produced by Total Cray Valley). The DYMALINK® metallic coagents are comprised of at least one metallic monomer coagent. The rubber compositions were prepared at room temperature and mixed using a Speed Mixer. When the last mixing step was finished, a first viscosity measurement was performed. After the initial viscosity measurement, all the compositions were stored in an oven at a constant temperature for a duration at least 20 days. The viscosity value of each rubber composition were measured, at room temperature, several times throughout the storage period.

Example 1

Curable liquid rubber compositions comprising Dymalink® 634 (zinc dimethacrylate, modified for scorch retarding) were tested in this Example to determine the potential impact of residual moisture contained by an inorganic filler on the stability of rubber compositions comprising a metallic monomer coagent during storage at 40° C. Table 1 provides the composition of the tested curable liquid rubber compositions, and FIG. 1 provides the viscosity trends of the curable liquid rubber compositions during storage at 40° C.

Other components of the curable liquid rubber compositions were as follows:

RICON® 130: A non-functionalized butadiene homopolymer having a 1,2 vinyl content of 28% and a Mn of 2500 g/mol (product of Total Cray Valley).

RICON® 130MA13: A maleinized butadiene homopolymer having a maleic anhydride content of about 13%, approximately four anhydride functional groups per chain, an anhydride equivalent weight of about 760 g/mole, and an Mn of 2900 g/mol (product of Total Cray Valley).

MBTS: 2-mercaptobenzothiazole disulfide, also known as 2,2'-dibenzothiazyl disulfide.

Ultra-Accelerator: Tetramethylthiuram disulfide (TMTD)

TABLE 1

| Compositions | Standard 1 | Trial No. 1 | Trial No. 2 |
|---|---|---|---|
| RICON ® 130 | 36.50% | 36.50% | 36.50% |
| RICON ® 130MA13 | 10.70% | 10.70% | 10.70% |
| Technical CaCO₃-wet | 37.50% | 37.50% | |
| Technical CaCO₃-dry | | | 37.50% |
| ZnO | 6.30% | 4.50% | 4.50% |
| Sulfur | 4.20% | 4.20% | 4.20% |
| MBTS | 2.40% | 2.40% | 2.40% |
| Ultra-Accelerator | 2.40% | 2.40% | 2.40% |
| Dymalink ® 634 | | 1.80% | 1.80% |
| TOTAL | 100.00% | 100.00% | 100.00% |

As illustrated in FIG. 1, the introduction of a metallic monomer coagent in the "Trial N°1" composition caused a significant increase in the viscosity of the "Trial N°1" composition during storage. By drying the calcium carbonate agglomerates (the inorganic filler), the initial viscosity of "Trial N°2" increased only slightly after four days of storage at 40° C., and the viscosity remained stable between the $5^{th}$ day and the $24^{th}$ day during storage at 40° C. This result indicates that the moisture content contained in the rubber composition has a strong effect on the rubber composition's viscosity stability.

Example 2

Curable liquid rubber compositions comprising a metallic monomer coagent and two different inorganic fillers were assessed to compare the effects of the different inorganic fillers on the viscosity stability of the curable liquid rubber compositions. The two commercially available inorganic fillers were calcium carbonates produced by OMYA. The OMYACARB® 1T-VA had a mean particle size of 2.1 µm and a moisture content of 0.3% by weight and the OMYABOND® 520-OM had a mean particle size of 1.7 µm and a moisture content of 0.04% by weight. The storage temperature for the curable liquid rubber compositions was increased in this Example from 40° C. to 50° C. Table 2 provides the compositions of the tested curable liquid rubber compositions, and FIG. 2 provides the viscosity trends of the curable liquid rubber compositions during storage at 50° C.

TABLE 2

| Compositions | Standard 2 | Trial Omya 1 T-VA | Trial Omya 520-OM |
|---|---|---|---|
| RICON ® 131 | 43.3% | 43.3% | 43.3% |
| RICON ® 130MA13 | 9.2% | 9.2% | 9.2% |
| Omyacard ® 1 T-VA | 29.3% | 29.3% | |
| Omyabond ® 520-OM | | | 29.3% |
| Technical CaCO₃ | 5.0% | 5.0% | 5.0% |
| ZnO | 4.2% | 2.7% | 2.7% |
| Zinc Stearate | 1.3% | 1.3% | 1.3% |
| Sulfur | 3.5% | 3.5% | 3.5% |
| MBTS | 2.2% | 2.2% | 2.2% |
| Ultra-Accelerator | 2.0% | 2.0% | 2.0% |
| Dymalink ® 634 | | 1.5% | 1.5% |
| TOTAL | 100.0% | 100.0% | 100.0% |

Figure 2:
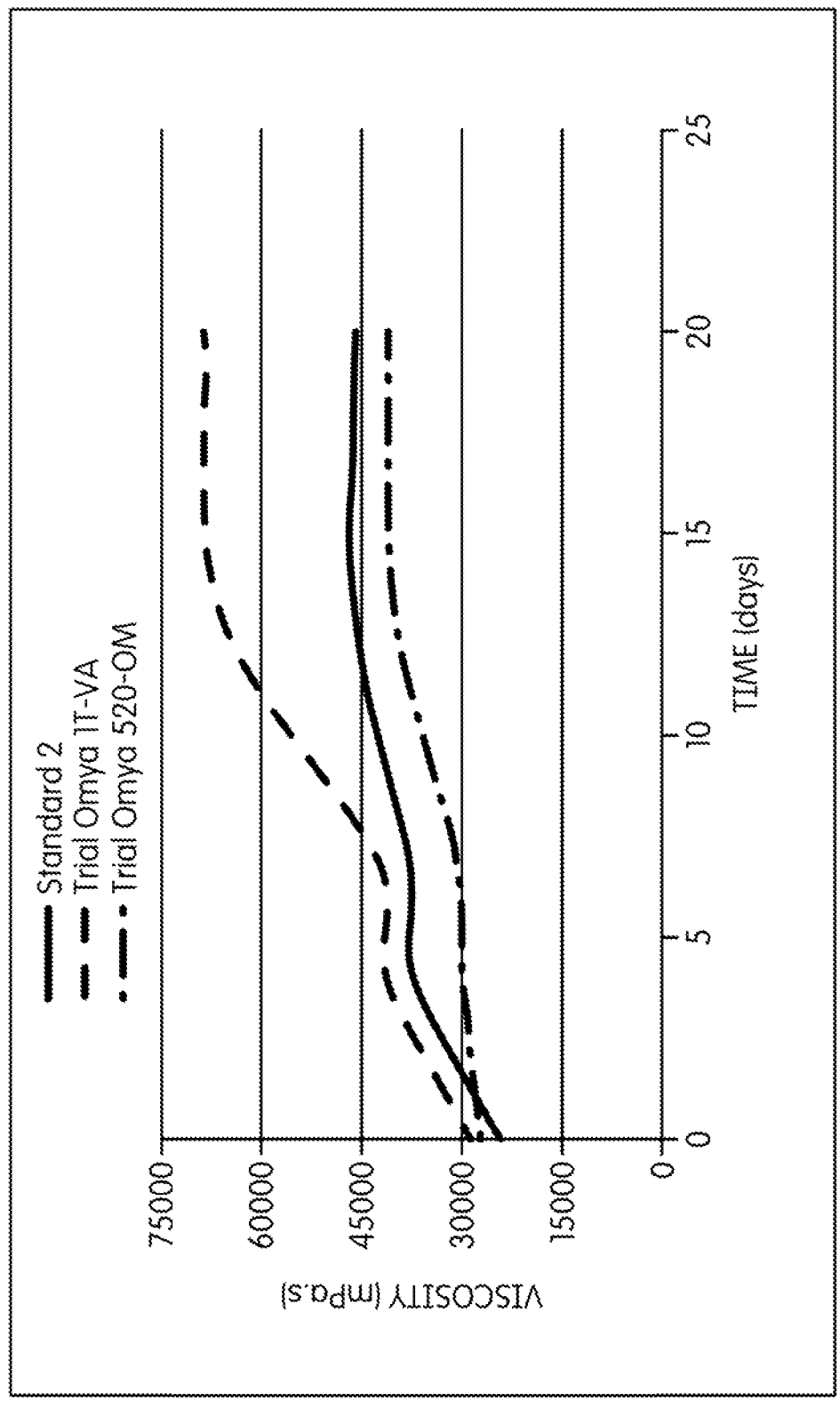
FIG. 2. is a graph depicting the viscosities of curable liquid rubber compositions comprising a metallic monomer coagent and different inorganic fillers during storage at 50° C.

As illustrated in FIG. 2, the viscosities for all three curable liquid rubber compositions increased over time. Nevertheless, the "Trial Omya 520-OM" curable liquid rubber composition, which contained OMYABOND® 520-OM and Dymalink® 634, possessed lower viscosity values than the "Standard 2" curable liquid rubber composition and the "Trial OMYACARB 1T-VA" curable liquid rubber composition between the $4^{th}$ day and the $20^{th}$ day of storage at 50° C. These results support the discovery that the residual moisture content significantly affects the viscosity stability of curable liquid rubber composition.

Although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A curable liquid rubber composition having improved viscosity stability, wherein the curable liquid rubber composition is comprised of:

a). at least one functionalized crosslinkable polymer that is liquid at 25° C., is comprised of at least one diene monomer in polymerized form, and is functionalized with one or more anhydride functional groups, one or more hydroxyl functional groups or one or more (meth)acrylate functional groups;

b). at least one non-functionalized crosslinkable polymer that is liquid at 25° C., is comprised of at least one diene monomer in polymerized form, and is not functionalized with one or more anhydride, hydroxyl or (meth)acrylate functional groups;

c). at least one metallic monomer coagent which is a metal carboxylate salt comprised of at least one (meth)acrylate functional group; and d). at least one inorganic filler;

wherein the curable liquid rubber composition has a total moisture content of not more than 1000 ppm.

2. The curable liquid rubber composition of claim 1, wherein the at least one diene monomer of the at least one functionalized crosslinkable polymer or the at least one non-functionalized crosslinkable polymer comprises butadiene.

3. The curable liquid rubber composition of claim 1, wherein at least one of the functionalized crosslinkable polymer(s) or the non-functionalized crosslinkable polymer(s) has a number average molecular weight of 800 g/mol to 15,000 g/mol.

4. The curable liquid rubber composition of claim 1, wherein at least one of the functionalized crosslinkable polymer(s) or the non-functionalized crosslinkable polymer(s) is selected from the group consisting of butadiene homopolymers and styrene-butadiene copolymers.

5. The curable liquid rubber composition of claim 1, wherein at least one of the functionalized crosslinkable polymer(s) or the non-functionalized crosslinkable polymer(s) has a vinyl content of 0.1% to 90%.

6. The curable liquid rubber composition of claim 1, wherein the at least one functionalized crosslinkable polymer includes at least one maleinized crosslinkable polymer.

7. The curable liquid rubber composition of claim 1, wherein the at least one metallic monomer coagent includes an alkali metal salt, alkaline earth metal salt, transition metal salt or post-transition metal salt of (meth)acrylic acid.

8. The curable liquid rubber composition of claim 1, wherein the at least one metallic monomer coagent includes at least one of a zinc carboxylate salt comprised of at least one (meth)acrylate functional group or a calcium carboxylate salt comprised of at least one (meth)acrylate functional group.

9. The curable liquid rubber composition of claim 1, wherein the at least one metallic monomer coagent includes at least one of a zinc carboxylate salt comprised of two (meth)acrylate functional groups or a calcium carboxylate salt comprised of two (meth)acrylate functional groups.

10. The curable liquid rubber composition of claim 1, wherein the at least one metallic monomer coagent comprises at least one of zinc di(meth)acrylate or calcium di(meth)acrylate.

11. The curable liquid rubber composition of claim 1, wherein the at least one inorganic filler comprises at least one inorganic filler selected from the group consisting of metal carbonates, metal oxides, silicas, carbonaceous fillers, and clays.

12. The curable liquid rubber composition of claim 1, wherein the at least one inorganic filler has an average particle size of 6.5 µm or less.

13. The curable liquid rubber composition of claim 12, where the average particle size of the at least one inorganic filler is 3.0 µm or less.

14. The curable liquid rubber composition of claim 1, wherein the at least one inorganic filler has a moisture content of not more than 0.05% by weight.

15. The curable liquid rubber composition of claim 1, further comprising a crosslinking system.

16. The curable liquid rubber composition of claim 15, wherein the crosslinking system is a sulfur-based crosslinking system or a peroxide-based crosslinking system.

17. The curable liquid rubber composition of claim 1, wherein the curable liquid rubber composition has a viscosity at 25° C. and the viscosity of the curable liquid rubber composition at 25° C. does not change by more than 60% after being heated at 40° C. for 20 days.

18. A cured cross-linked rubber obtained by curing the curable liquid rubber composition of claim 1.

19. A method of obtaining a cured cross-linked rubber, comprising curing the curable liquid rubber composition of claim 1.

20. A method of improving the viscosity stability of a curable liquid rubber composition, wherein the curable liquid rubber composition is comprised of:

a). at least one functionalized crosslinkable polymer that is liquid at 25° C., is comprised of at least one diene monomer in polymerized form, and is functionalized with one or more anhydride functional groups, one or more hydroxyl functional groups or one or more (meth)acrylate functional groups;

b). at least one non-functionalized crosslinkable polymer that is liquid at 25° C., is comprised of at least one diene monomer in polymerized form, and is not functionalized with one or more anhydride, hydroxyl or (meth)acrylate functional groups;

c). at least one metallic monomer coagent which is a metal carboxylate salt comprised of at least one (meth)acrylate functional group; and d). at least one inorganic filler;

wherein the method comprises formulating the curable liquid rubber composition to have a total moisture content of not more than 1000 ppm.

* * * * *